(12) United States Patent
Cotton et al.

(10) Patent No.: US 8,354,190 B2
(45) Date of Patent: Jan. 15, 2013

(54) ELECTRODES AND ELECTRODE MATERIAL FOR LITHIUM ELECTROCHEMICAL CELLS

(75) Inventors: Frederic Cotton, Montreal (CA); Patrick LeBlanc, Boucherville (CA); Thierry Guena, Longueuill (CA); Alain Vallee, Varennes (CA); Jean-Luc Monfort, Montreal (CA)

(73) Assignee: Bathium Canada Inc., Boucherville, Quebec ( * ) Notice: Subject to any disclaimer, the term of this patent is extended or adjusted under 35 U.S.C. 154(b) by 340 days.

(21) Appl. No.: 12/767,419

(22) Filed: Apr. 26, 2010

(65) Prior Publication Data

US 2010/0273054 A1     Oct. 28, 2010

Related U.S. Application Data

(60) Provisional application No. 61/172,954, filed on Apr. 27, 2009.

(51) Int. Cl.
| H01M 4/525 | (2010.01) |
| H01M 4/02 | (2006.01) |
| H01M 4/52 | (2010.01) |
| H01M 4/505 | (2010.01) |
| H01M 4/485 | (2010.01) |

(52) U.S. Cl. ..... 429/209; 429/221; 429/224; 429/231.1; 429/231.3; 429/231.5

(58) Field of Classification Search ................ 429/209, 429/221, 224, 231.5, 231.3, 223, 231.1; 252/182.1
See application file for complete search history.

(56) References Cited

U.S. PATENT DOCUMENTS

2008/0311464 A1    12/2008  Krause et al.

FOREIGN PATENT DOCUMENTS

| CN | 101207190 A | 6/2008 |
| EP | 1833109 A1 | 9/2007 |
| JP | 2004039539 A | 2/2004 |
| WO | WO 0107367 A1 * | 2/2001 |

OTHER PUBLICATIONS

International Search Report of PCT/CA2010/000655, Jul. 14, 2010, Irina Kargina.
English abstract of JP 2004039539, Feb. 5, 2004.
English abstract of CN 101207190, Jun. 25, 2008.

* cited by examiner

*Primary Examiner* — Gregg Cantelmo
(74) *Attorney, Agent, or Firm* — McMillan LLP

(57) ABSTRACT

An electrode and an electrode material for lithium electrochemical cells are disclosed. The electrode material is in powder form and has a particle size distribution wherein the measured particle size distribution of the electrode material has a median size $D_{50}$ ranging from 1.5 μm and 3 μm, a $D_{10} \geq 0.5$ μm, a $D_{90} \leq 10.0$ μm, and a calculated ratio $(D_{90}/D_{10})/D_{50} \geq 3.0$ which is indicative of a peak of the measured particle size distribution on the left of the median $D_{50}$ which improves the loading and energy density of the electrode produced with this electrode material powder.

7 Claims, 3 Drawing Sheets

ELECTRODES AND ELECTRODE MATERIAL FOR LITHIUM ELECTROCHEMICAL CELLS

CROSS-REFERENCE

The present application claims priority to U.S. Provisional Patent Application 61/172,954, filed Apr. 27, 2009, the entirety of which is incorporated herein by reference.

TECHNICAL FIELD

The present invention relates to lithium electrochemical cells and more specifically to electrodes and electrode materials for lithium polymer batteries.

BACKGROUND

Rechargeable batteries are used in a wide range of applications demanding high specific energy, high rate capabilities, long cycle life and long calendar life. The quality of the active materials constituting the electrodes of the batteries is paramount in order to reach these targets. The design and quality of the electrodes constituted of these materials are critical as well. For example, higher cathode thickness is detrimental for high rate performances but favourable for higher energy content. Another example is the porosity of electrodes for lithium-ion batteries because the porosity controls the amount of electrolyte which can be soaked and spread within the electrode when liquid electrolyte is used to provide the ionic conduction between the electrodes. In liquid electrolyte batteries, electrodes have porosities in the range of 30% to 50% in order to accommodate sufficient electrolyte penetration. Porosity can be achieved in many different ways such as thickness reduction of the electrode by mechanical means, electrode making process, electrode formulation and in certain cases by the adjunction of pore forming additives. Active materials themselves impact porosity. In order to insure reproducible electrodes characteristics, battery manufacturers put a lot of emphasis on the supply of reproducible raw materials and on in-house statistical process controls (SPC).

In the case of solid polymer electrolyte lithium batteries, the polymer itself is the ionic conductive media. Therefore, there is no need to impregnate the electrode with liquid and the electrodes need not have any porosity for the purpose of ionic conduction. The solid polymer plays the role of both a binder and electrolyte.

The optimal configuration of an electrode for solid polymer electrolyte lithium batteries can be described as the highest active material loading within the polymer matrix which can be achieved by optimal spatial arrangement of the electrode material particles. As the ratio of active material to binder increases, there is more chance of trapping air or gas in the spacing between the contacting electrode material particles. This trapped air or gas is responsible for the measured porosity of the electrode.

The spatial arrangement of the electrode material particles within the electrode is greatly influenced by their intrinsic and mutual properties i.e. particle shape, interparticle interactions and particle size distribution. Related parameters such as the effectiveness of the polymer binder to wet the electrode material particles can also influence the spatial arrangement of the particles within the electrode.

Therefore, there is a need for an electrode for solid polymer electrolyte batteries with improved active material loading and improved spatial arrangement of the material particles within the electrode and for electrode materials which contribute to increasing the loading of an electrode manufactured therewith.

SUMMARY

Example embodiments of the present electrode and an electrode material for lithium electrochemical cells ameliorate at least some of the inconveniences present in the prior art.

Example embodiments of the present electrode and an electrode material for lithium electrochemical cells increase the loading of electrode material particles within an electrode.

Example embodiments of the present electrode and an electrode material for lithium electrochemical cells increase the energy density of a thin film electrode.

In one aspect, an electrode material for solid polymer lithium electrochemical cells has particles of electrochemically active material having a diameter D and a measured particle size distribution, the measured particle size distribution of the electrode material has a median size $D_{50}$ ranging from 1.5 μm and 3 μm, a $D_{10} \geqq 0.5$ μm, a $D_{90} \leqq 10.0$ μm and a calculated ratio $(D_{90}/D_{10})/D_{50} \geqq 3.0$.

In a further aspect, an electrode material for solid polymer lithium electrochemical cells has a standard deviation σ wherein the ratio of $\sigma/D_{50} \geqq 0.5$.

In another aspect, an electrode for solid polymer lithium electrochemical cells has a thickness and comprises a polymer electrolyte binder and electrode material particles having a diameter D and a measured particle size distribution, the measured particle size distribution of the electrode material has a median size $D_{50}$ ranging from 1.5 μm and 3 μm, a $D_{10} \geqq 0.5$ μm, a $D_{90} \leqq 10.0$ μm and a calculated ratio $(D_{90}/D_{10})/D_{50} \geqq 3.0$.

In an embodiment, the median size $D_{50}$ of the electrode material powder is at least 10 times smaller than the thickness of the electrode.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
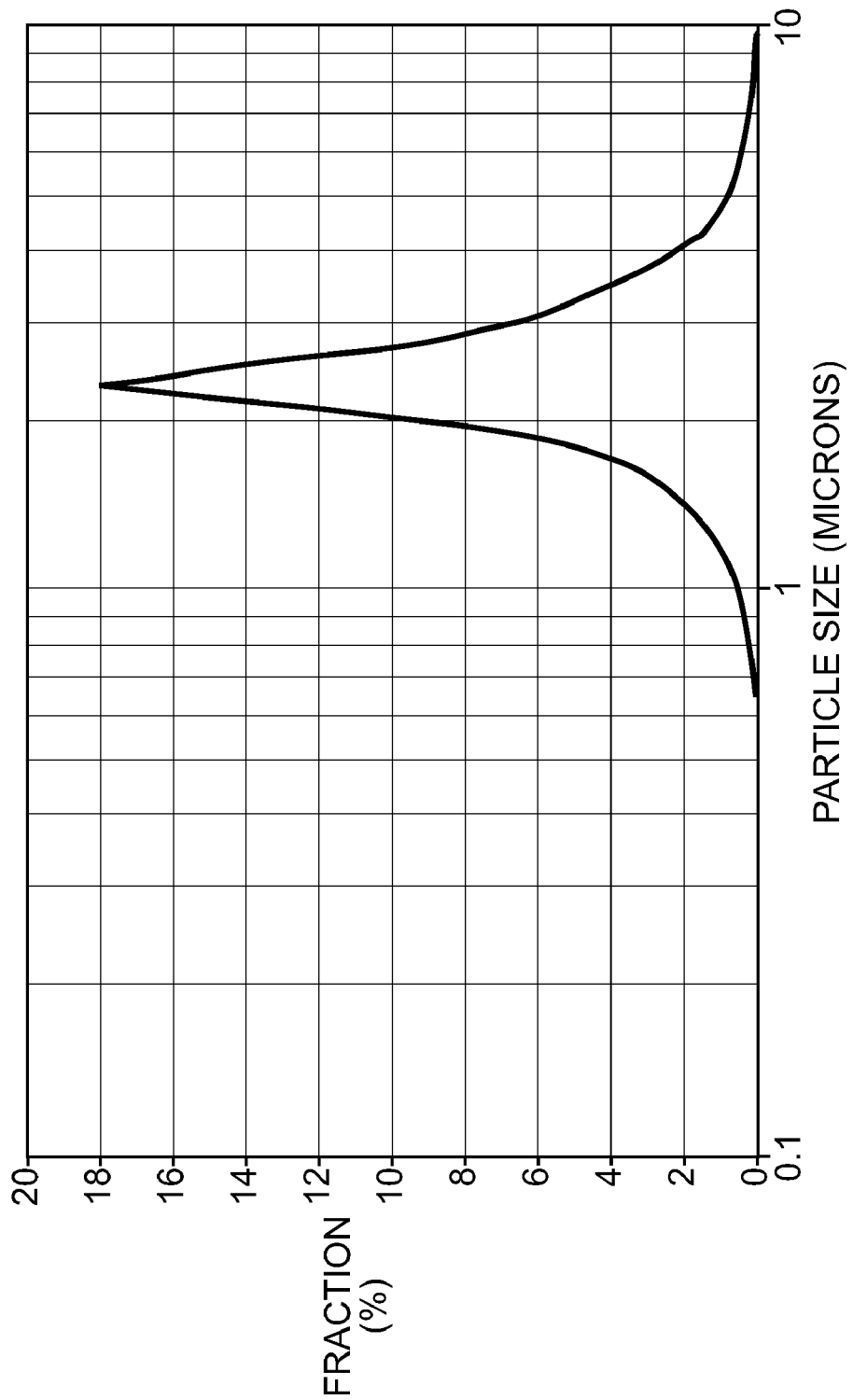
FIG. 1 is a graph representing a measured particle size distribution obtained by a laser diffraction method of an electrode material powder considered as having a narrow particle size distribution.

In order to improve active material loading through improved spatial arrangement of the material particles within the electrode, it is generally easier to tailor the particle size distribution than it is to modify the interactions between particles to reach the optimal spatial packing without affecting electrochemical performances.

A dense hard packing of spherical particles of identical size leads to empty spaces or voids between the particles. The presence of smaller particles to fill the voids is beneficial to increase the active material density of the packing. The packing of a powder having a narrow particle size distribution can be best described as a dense packing of particles of identical size, resulting in a lower material density and higher porosity than that of a powder with a broader particle size distribution in which smaller particles can intercalate in the void between larger particles.

In practice, the particle size is also important. Large particles, on the scale of the thickness of the electrode, tend to generate surface non-uniformity. On the other hand, very small particles have much more surface area than larger ones, increasing the potential inter-particle interactions possibly resulting in agglomeration, suspension instability and other related problem, making the fabrication process of the electrode more complex and delicate. The mean particle size of an electrode material powder should be at least 10 times smaller than the thickness of the electrode, preferably 20 times smaller, and the larger particles of the distribution ($D_{99}$) should not be larger than ⅕ of the electrode thickness. In the smallest particle size, it is preferable not to have particles having a diameter of less than 100 nm.

In solid polymer electrolyte batteries, the thickness of the electrode ranges from 10 μm to 100 μm, or between 20 μm and 70 μm depending on the energy requirements of the batteries. Typical electrode materials for solid polymer electrolyte batteries are for example: Lithiated compounds of Iron phosphates such as $LiFePO_4$ and its derivatives, $LiMn_2O_4$ spinel and its derivatives, lithiated compounds of Vanadium Oxides such as $LiV_3O_8$ and its derivatives, lithiated Manganese Oxides $LiMnO_2$ and its derivatives, lithiated Cobalt oxides and lithiated Nickel Cobalt oxides such as $LiCoO_2$, $LiNiCoO_2$ and their derivatives, and Lithium Titanates $Li_4Ti_5O_{12}$ and its derivatives.

In electrodes of solid polymer electrolyte batteries, the polymer electrolyte serves as the binder of the electrode material and acts as the ionic conductor such that ideally there should be no porosity in the electrode as opposed to Li-ion batteries which use a liquid electrolyte that require electrodes with porosities in order for the liquid electrolyte to infiltrate the electrodes to reach the electrode particles and conduct lithium ions in and out of the electrodes.

For purposes of the present application, the definition of a particle is a small (micron scale) solid body, or agglomerate of solid bodies, that could be displaced as a whole from the other solid bodies surrounding it. For example, an agglomerate of particles that will not break during the electrode fabrication process is considered as a single particle. The concepts outlined herein also apply to particles having elongated shape within a shape factor of $L/D \leq 3$, where L is the length of the particle and D is the diameter of the particle.

The broadness of a particle size distribution can be quantified by statistical methods. A currently used method is to take the difference between the $3^{rd}$ and the $1^{st}$ quartile of the cumulative particle size distribution curve ($D_{75}$ minus $D_{25}$). Many other variants of this method can be used, for example the difference between the $80^{th}$ and the $20^{th}$ percentile of the cumulative particle size distribution curve ($D_{80}$ minus $D_{20}$). The disadvantage of this method is that it is representative of only two points on the cumulative particle size distribution curve and not of the whole particle size distribution. Another method, more representative of the whole particle size distribution, is to use the standard deviation ($\sigma$) of the particle size over the mean or median particle size ($D_{50}$) represented by $\sigma/D_{50}$.

The distribution of particle sizes around the median particle size $D_{50}$ of a specific batch of electrode material powder has been linked with the loading of the electrode produced with that specific batch of electrode material powder and therefore with the overall energy density of the battery. It has been found that the loading of the electrode is substantially improved by using a batch of electrode material powder having particle sizes more largely distributed around the median particle size $D_{50}$ of the batch than by using a batch of electrode material powder having particle sizes concentrated around the median particle size $D_{50}$ of the batch. Since a low standard deviation $\sigma$ indicates that the particle sizes tend to be very close to the median particle size $D_{50}$, while a high standard deviation $\sigma$ indicates that the particle sizes are "spread out" over a larger range, using batches of electrode material powder with a larger standard deviation $\sigma$ increases the effective loading of the electrode being produced.

FIG. 1 is a graph representing a particle size distribution of an electrode material powder considered as having a narrow particle size distribution. The batch of electrode material powder it represents has a high concentration of particle sizes around the median particle size $D_{50}$ of 2.53 μm. The standard deviation $\sigma$ of this particular batch of electrode material is 1.09 μm and its calculated ratio $\sigma/D_{50}$=0.431. This kind of particle size distribution is generally obtained after sieving the powder to remove the smaller and larger particles. When processed into an electrode, this material gives a low material density and a high level of porosity resulting in a low energy density of the electrode. The effective loading of the electrode is not optimal because the electrode material powder has few smaller particles that can intercalate in the voids between larger particles as represented by the narrow particle size distribution.

Figure 2:
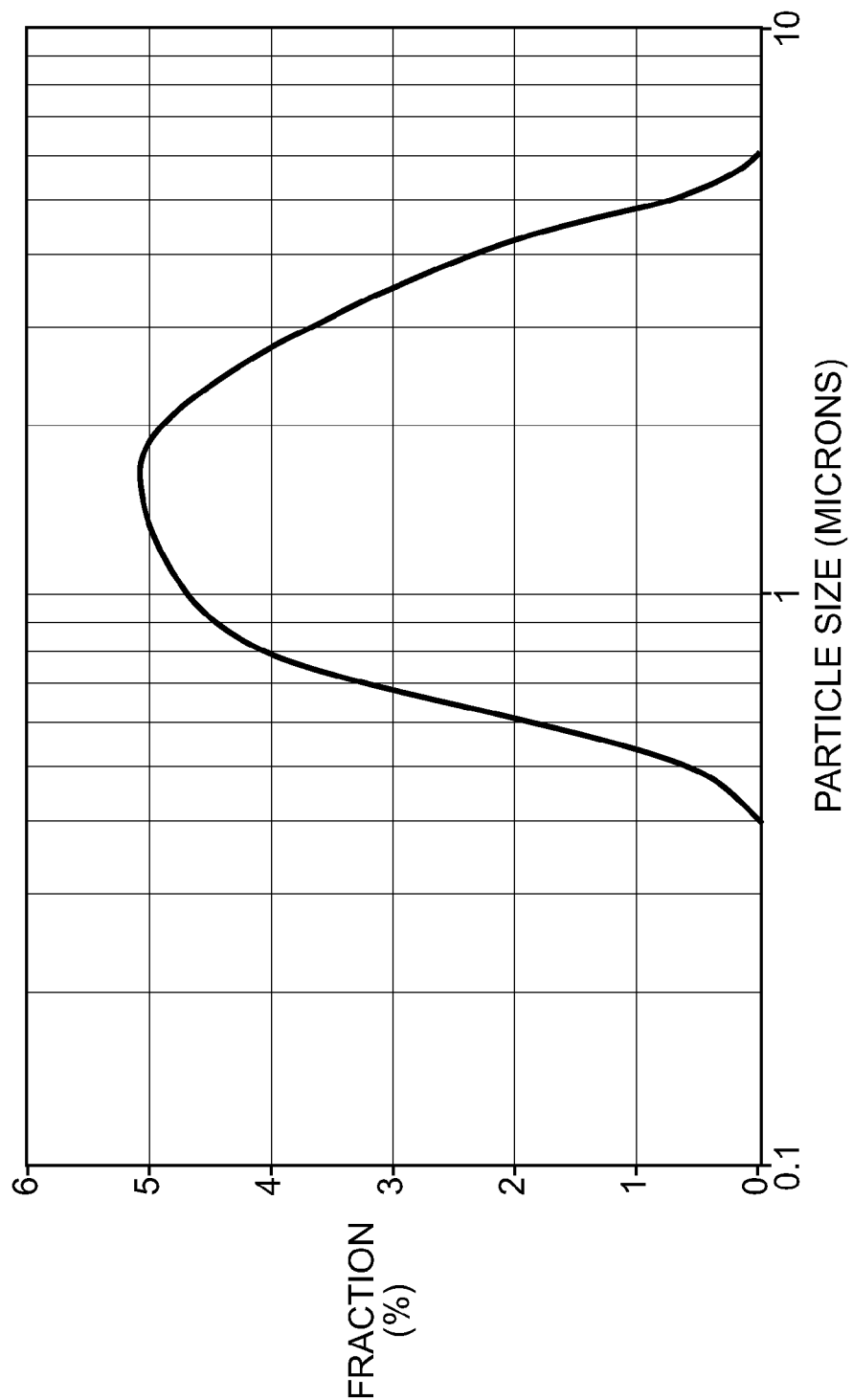
FIG. 2 is a graph representing a measured particle size distribution obtained by a laser diffraction method of an electrode material powder considered as having a broad particle size distribution in accordance with one embodiment.

FIG. 2 is a graph representing a particle size distribution of an electrode material powder considered as having a broad particle size distribution. The batch of electrode material powder it represents includes a substantial amount of particle sizes spread out around the median particle size $D_{50}$ of 2.29 μm as represented by the standard deviation $\sigma$ of 1.17. The calculated ratio $\sigma/D_{50}$=0.511. When processed into an electrode, this material gives a high material density and a low level of porosity resulting in a higher energy density electrode. The effective loading of the electrode prepared with the electrode material powder of FIG. 2 is superior to the effective loading of the electrode prepared with the electrode material powder of FIG. 1 because the electrode material powder of FIG. 2 includes more small particles that can intercalate in the voids between the larger particles as represented by the broad particle size distribution. The calculated ratio $\sigma/D_{50}$ of 0.511 is a strong indicator of the target particle size distribution required to provide an optimal effective loading of an electrode produced with a batch of electrode material powder.

Figure 3:
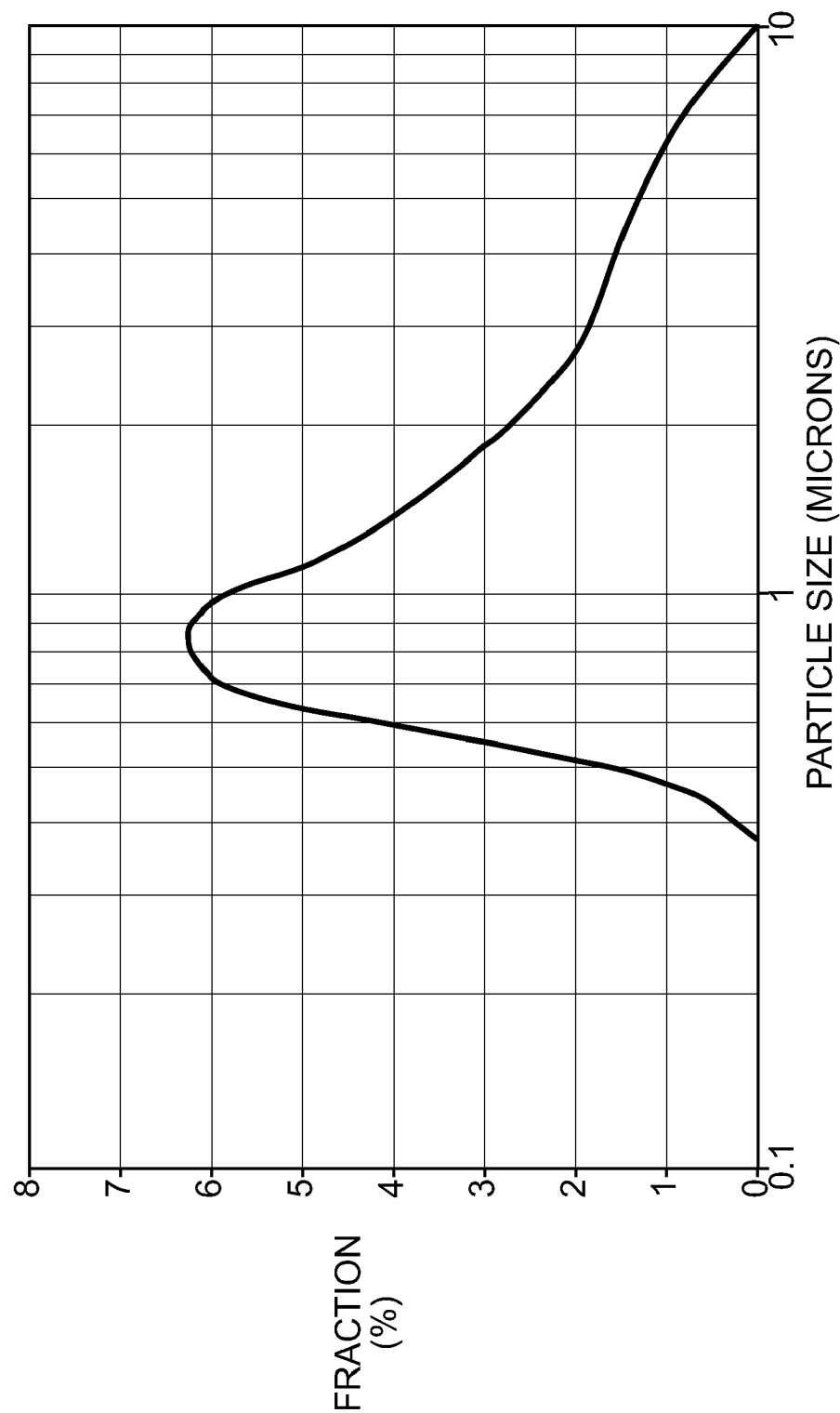
FIG. 3 is a graph representing a measured particle size distribution obtained by a laser diffraction method of an electrode material powder having an ideal particle size distribution in accordance with one embodiment.

FIG. 3 is a graph representing a particle size distribution of an electrode material powder having an ideal particle size distribution. The batch of electrode material powder it represents includes a substantial amount of particle sizes spread out around the median particle size $D_{50}$ of 2.61 μm as represented by the standard deviation $\sigma$ of 2.24. The calculated ratio $\sigma/D_{50}$=0.858 is indicative that the particle size distribution required to provide an optimal effective loading of an electrode has been reached. FIGS. 2 and 3 demonstrate that a batch of electrode material having a calculated ratio $\sigma/D_{50}$ of 0.5 or more ($\sigma/D_{50} \geq 0.5$) improves the loading and the energy density of the electrode produced. It has been found that there is a direct link between the calculated ratio $\sigma/D_{50}$ of a batch of electrode material and the optimal loading of an electrode made with a batch of electrode material.

Furthermore, the particle size distribution of the batch of electrode material powder illustrated in FIG. 3 shows a larger amount of particles having a smaller size than the median $D_{50}$ than the amount of particles having a larger size than the median $D_{50}$. As illustrated in FIG. 3, the peak of the particle size distribution graph is shifted towards the left of the median $D_{50}$ towards the smaller particle sizes within the 0.8 to 2.0 µm range. This particular distribution of particle size provides an ideal amount of small size particles that can intercalate in the voids between the larger particles and therefore gives the highest material density and the highest loading of electrode material in the electrode to be produced. The particle size distribution of FIG. 3 provides a very low level of porosity in the electrode to be produced and therefore a very high energy density. The calculated ratio $\sigma/D_{50}$ of 0.858 indicates a sufficiently broad particle size distribution but does not indicate that the peak of the particle size distribution is shifted towards the left of the median $D_{50}$. A calculated ratio of $(D_{90}/D_{10})/D_{50} \geqq 3.0$ is representative of a particle size distribution shifted towards the left of the median $D_{50}$. The particle size distribution of the batch of electrode material powder of FIG. 3 shows a $D_{90}$ of 7.43 µm and a $D_{10}$ of 0.83 µm. With $D_{50}=2.61$ µm, $(D_{90}/D_{10})/D_{50}=(7.43/0.83)/2.61=3.43$ which meets the criteria of $(D_{90}/D_{10})/D_{50} \geqq 3.0$.

For example, a batch of electrode material having a $D_{10}=1.0$ µm, a $D_{90}=6.0$ µm with a normal distribution would have a $D_{50}=3.5$ µm. The ratio of $(D_{90}/D_{10})/D_{50}$ would therefore be $(6.0/1.0)/3.5=1.714$ which falls outside the criteria of $(D_{90}/D_{10})/D_{50} \geqq 3.0$. However, a $D_{50} \leqq 2.0$ µm would indicate a peak of the graph shifted to the left of the median $D_{50}$ and therefore a larger amount of smaller particles relative to bigger particles and would meet the criteria of $(D_{90}/D_{10})/D_{50} \geqq 3.0$.

Referring back to FIG. 1, the particle size distribution has a $D_{10}$ of 1.87 µm, a $D_{90}$ of 4.14 µm and a D50 of 2.53. The calculated ratio of $(D_{90}/D_{10})/D_{50}$ is therefore $(4.14/1.87)/2.53=0.875$ which falls outside the criteria of $(D_{90}/D_{10})/D_{50} \geqq 3.0$.

Referring back to FIG. 2, the particle size distribution has a $D_{10}$ of 1.00 µm, a $D_{90}$ of 4.18 µm and a $D_{50}$ of 2.29. The calculated ratio of $(D_{90}/D_{10})/D_{50}$ is therefore $(4.18/1.00)/2.29=1.825$ which falls outside the criteria of $(D_{90}/D_{10})/D_{50} \geqq 3.0$. However the particle size distribution of FIG. 2 is closer to the threshold of 3.0 as can be seen by the large amount of particle size to the left of the median $D_{50}$ relative to the amount of particle size to the right of the median $D_{50}$ indicative of a desirable particle size distribution. If $D_{50} \leqq 1.39$ µm the peak of the graph would be shifted to the left of the median $D_{50}$ and therefore a larger amount of smaller particles relative to bigger particles size, the particle size distribution of FIG. 2 would meet the criteria of $(D_{90}/D_{10})/D_{50} \geqq 3.0$.

A batch of electrode material powder having a median size $D_{50}$ ranging from 1.5 µm and 3 µm is desirable for producing thin electrode for thin films batteries. An ideal particle size distribution includes a $D_{10}$ of more than 0.5 µm, and a $D_{90}$ of less than 10.0 µm with a calculated ratio $(D_{90}/D_{10})/D_{50} \geqq 3.0$ which is indicative of a peak of the particle size distribution on the left of the median $D_{50}$ towards the smaller particle sizes within the 0.8 to 2.0 µm range.

Thus, a batch of electrode material having a calculated ratio $\sigma/D_{50}$ of 0.5 or more ($\sigma/D_{50} \geqq 0.5$) which is indicative of a sufficiently wide spread distribution of particle sizes to obtain an electrode having a high material density and a low level of porosity resulting in a high energy density electrode.

However, a batch of electrode material having a calculated ratio $(D_{90}/D_{10})/D_{50} \geqq 3.0$ indicative of a peak of the particle size distribution on the left of the median $D_{50}$, a median size $D_{50}$ ranging from 1.5 µm and 3 µm and a $D_{10} \geqq 0.5$ µm, and a $D_{90} \leqq 10.0$ µm provides an ideal particle size distribution for producing an electrode having a higher material density and a extremely low level of porosity providing an optimal effective loading of the electrode resulting in a higher energy density electrode. Alternatively, the calculated ratio $(D_{90}/D_{10})/D_{50}$ is equal to or higher than 4.0 ($\geqq 4.0$). Alternatively, the calculated ratio $(D_{90}/D_{10})/D_{50}$ is equal to or higher than 5.0 ($\geqq 5.0$).

The electrode material with a particle size distribution as illustrated in FIG. 3 may be prepared by various synthesis method such as precipitation-hydrothermal synthesis reaction; solid state sintering; molten process; spray pyrolysis and jet milling. In each case, the synthesis is followed by grinding or milling in which the parameters of time (duration) and the size and hardness of the beads used are adjusted to achieve the desired ratio $(D_{90}/D_{10})/D_{50} \geqq 3.0$ as well as a homogeneous particle mixing. The duration of the grinding or milling is critical as too long a duration of grinding or milling leads to excessive amount of nanoscale particles which are difficult to sieve and too short a duration of grinding or milling leads to a normal distribution of particle sizes. The electrode particles is to be grinded past the normal distribution to the point where the small particles (0.5 µm$\leqq$D$\leqq$~2.5 µm) begin to accumulate in excess of the larger particles (~2.5 µm$\leqq$D$\leqq$10.0 µm).

Electrodes for solid polymer batteries produced with the electrode material powders represented by the particle size distribution of FIG. 3 enable higher loading and therefore higher energy density than electrode material with a similar particle size range but a normal particle size distribution. A batch of electrode material having a calculated ratio $(D_{90}/D_{10})/D_{50} \geqq 3.0$ improves the loading and the energy density of the electrode produced. It has been found that there is a direct link between the calculated ratio $(D_{90}/D_{10})/D_{50} \geqq 3.0$ of a batch of electrode material and the optimal loading of an electrode in a solid polymer battery. An electrode manufactured with a batch of electrode material powder selected with a calculated ratio $(D_{90}/D_{10})/D_{50} \geqq 3.0$ displays low porosity and a high energy density and lithium electrochemical cells including such an electrode also have a higher energy density.

Modifications and improvements to the above-described embodiments may become apparent to those skilled in the art. The foregoing description is intended to be exemplary rather than limiting. The scope of the present invention is therefore intended to be limited solely by the scope of the appended claims.

What is claimed is:

1. An electrode material for solid polymer lithium electrochemical cells, the electrode material comprising particles of electrochemically active material having a diameter D, a measured particle size distribution and a standard deviation ($\sigma$), the measured particle size distribution of the electrode material has a median size $D_{50}$ ranging from 1.5 µm and 3 µm, a $D_{10} \geqq 0.5$ µm, a $D_{90} \leqq 10.0$ µm, a calculated ratio $(D_{90}/D_{10})/D_{50} \geqq 3.0$, and a ratio $\sigma/D_{50} \geqq 0.5$.

2. An electrode material as defined in claim 1 wherein the calculated ratio $(D_{90}/D_{10})/D_{50} \geqq 4.0$.

3. An electrode material as defined in claim 1 wherein the calculated ratio $(D_{90}/D_{10})/D_{50} \geqq 5.0$.

4. An electrode material as defined in claim 1 wherein the electrode material is selected from the group of lithiated compounds of iron phosphates, $LiMn_2O_4$ spinel and its derivatives, lithiated compounds of vanadium oxides, lithiated manganese oxides and its derivatives, lithiated cobalt oxides and lithiated nickel cobalt oxides and their derivatives, and lithium titanates and its derivatives.

5. An electrode for solid polymer lithium electrochemical cells, the electrode having a thickness and comprises a polymer electrolyte binder and electrode material particles having a diameter D and a measured particle size distribution, the measured particle size distribution of the electrode material has a median size $D_{50}$ ranging from 1.5 µm and 3 µm, a $D_{10} \geqq 0.5$ µm, a $D_{90} \leqq 10.0$ µm, and a calculated ratio $(D_{90}/D_{10})/D_{50} \geqq 3.0$, wherein the median size $D_{50}$ of the electrode material is at least 10 times smaller than the thickness of the electrode.

6. An electrode as defined in claim 5 wherein the median size $D_{50}$ of the electrode material is at least 20 times smaller than the thickness of the electrode.

7. An electrode as defined in claim 5 wherein larger particles (D99) of the measured particle size distribution are not larger than ⅕ of the thickness of the electrode.

* * * * *